June 7, 1932.  C. W. LEGUILLON ET AL  1,862,024
TIRE BUILDING APPARATUS
Filed Nov. 14, 1928   2 Sheets-Sheet 1
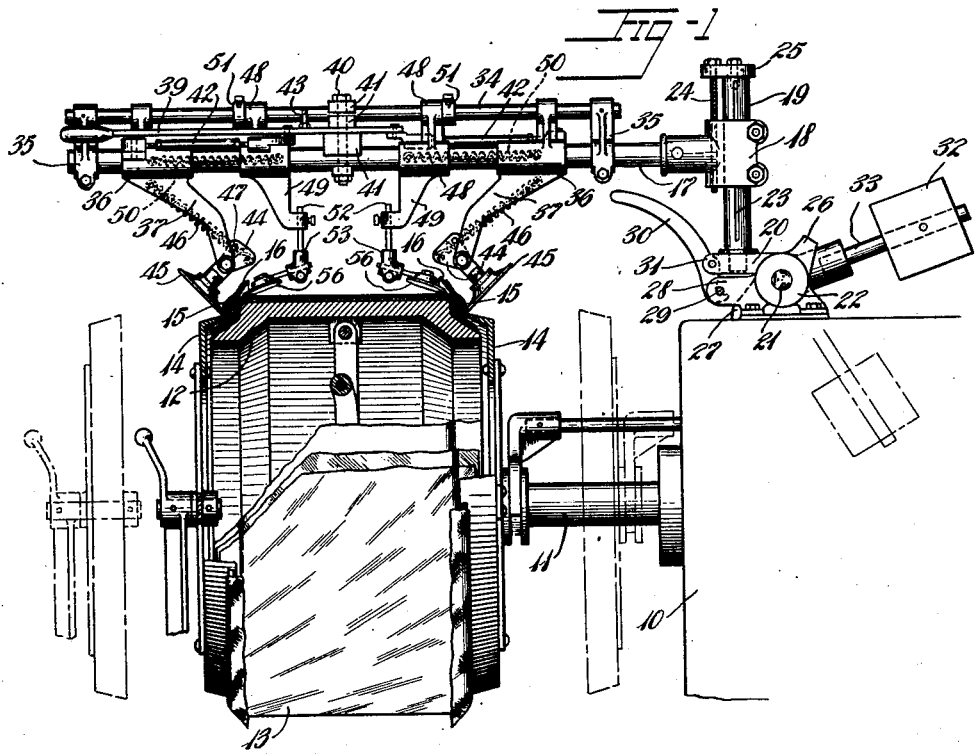
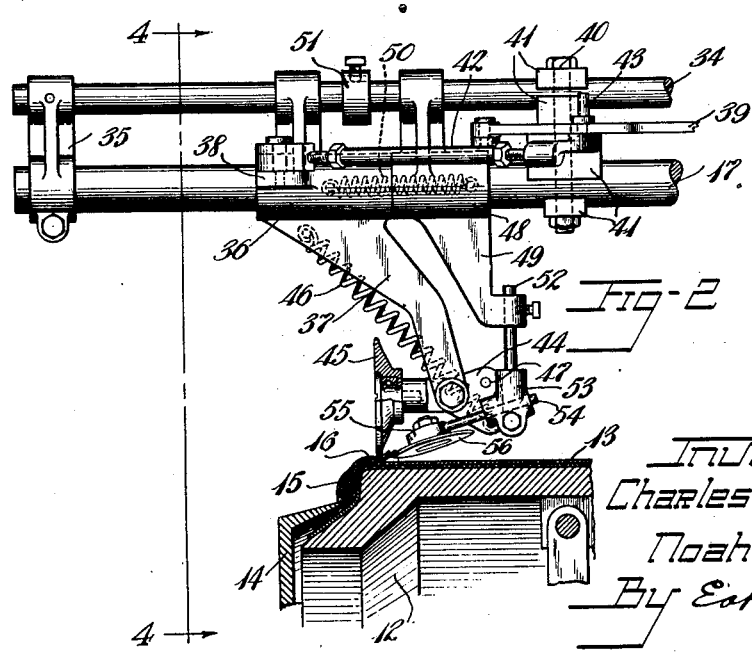
Inventors
Charles W. Leguillon
Noah L. Warner
By Eakin & Avery
Attys.

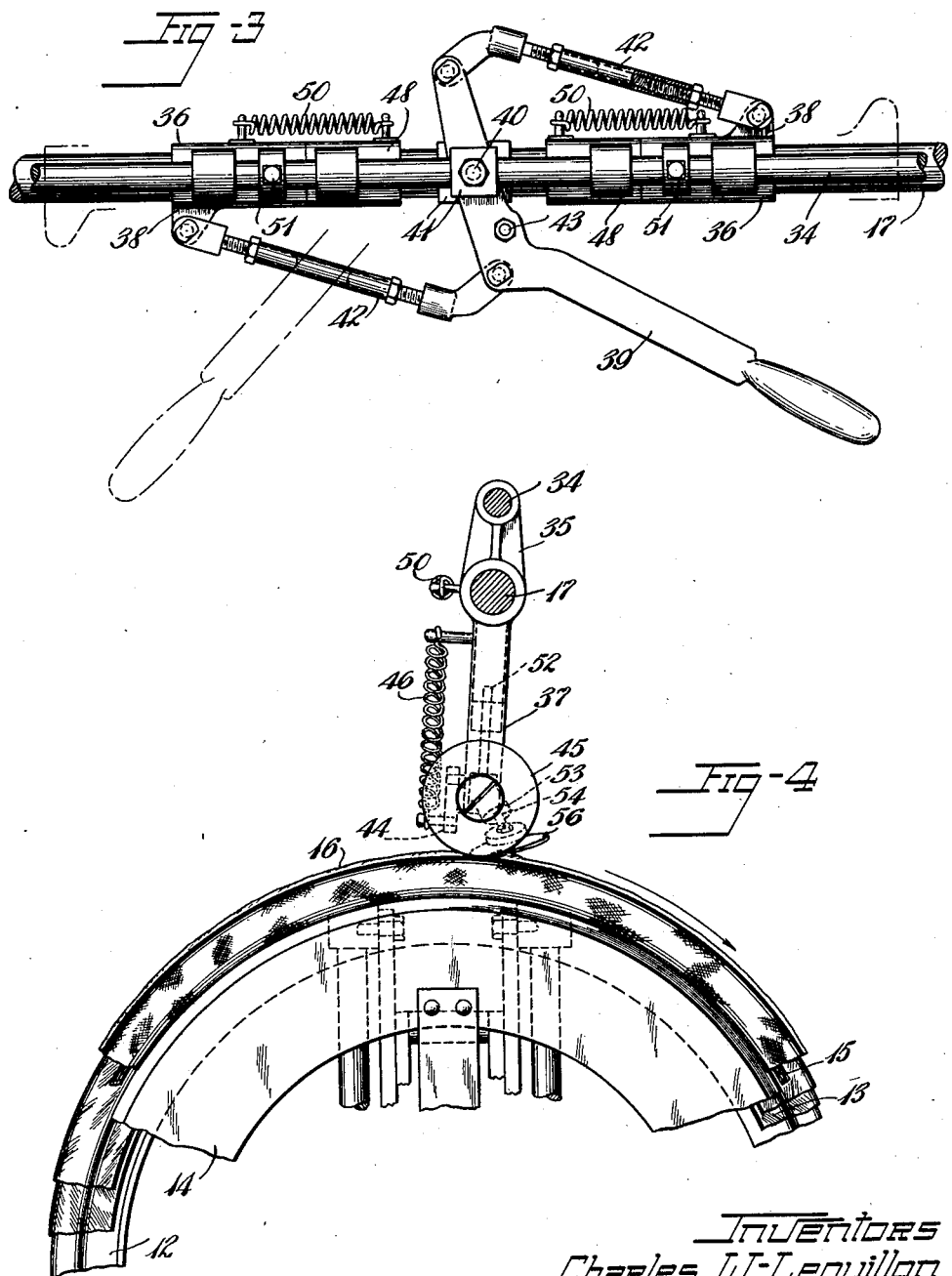

Patented June 7, 1932

1,862,024

UNITED STATES PATENT OFFICE

CHARLES W. LEGUILLON AND NOAH L. WARNER, OF AKRON, OHIO, ASSIGNORS TO THE B. F. GOODRICH COMPANY, OF NEW YORK, N. Y., A CORPORATION OF NEW YORK

TIRE BUILDING APPARATUS

Application filed November 14, 1928. Serial No. 319,310.

This invention relates to tire-building methods and apparatus, and especially to procedure and mechanism for incorporating the tire beads in a partly-built tire casing. The invention has its primary utility in the application of flipper beads to pulley band or drum-built tires, and the chief objects of the invention are to obtain greater accuracy in this positioning of the beads, to reduce the time required for the bead-placing operation, and to obviate chafing of the fabric portions of the bead structure.

Of the accompanying drawings:

Fig. 1 is a front elevation of apparatus embodying my invention in its preferred form, and the work therein, at the beginning of an operative cycle, a part being broken away and in section.

Fig. 2 is a view on a larger scale of a portion of the apparatus shown in Fig. 1 at a subsequent period of operation.

Fig. 3 is a plan view of parts of the apparatus.

Fig. 4 is a section on line 4—4 of Fig. 2.

Referring to the drawings, 10 is the framework of a tire-building machine of known construction, 11 is a driven spindle extending from one side thereof, 12 is a collapsible tire-building drum of the slope-shoulder type mounted upon the end of said spindle, and 13 is a partly built tire carcass on said drum. Retractible bead-setting rings 14, 14 are shown in bead setting position at each side of the drum 12, and flipper beads 15, 15 having the usual outwardly-extending flippers 16, 16 of rubberized fabric are shown on said rings 14 in association with the tire-carcass 13 at the lateral shoulders thereof.

Our improved mechanism for applying the tire-beads 15 is carried by a supporting bar 17 secured at one end in a bracket 18 which is mounted for sliding movement upon a post 19 secured in a hub member 20. The latter is mounted on a shaft 21 journaled in a pair of bearing brackets, such as the bearing-bracket 22, Fig. 1, mounted upon the framework 10. The post 19 is provided with a feather 23 for preventing angular movement of the bracket 18 on the post, and an adjustment screw 24 extending through an aperture in a cap 25 on the free end of said post and threaded into the bracket 18 is provided for adjusting the bracket axially of the post.

The supporting-bar 17 is adapted to be disposed in the operative, full-line position shown in Fig. 1, transverse to the drum 12, preferably above the same, and parallel with the drive-spindle 11, or the bar may be swung to the inoperative position indicated by the broken-line position of the counterweight 32 in said figure, wherein the center of gravity of the bar assembly is over-center with relation to the shaft 21. The provision of the adjustment screw 24 permits the bar 17, and mechanism carried thereby, to be moved toward or away from the drum 12, as a unit, without altering the angularity of said mechanism with relation to the drum, to adapt the apparatus for use with drums of various sizes.

The hub-member 20 is formed with a radial lug 26 adapted to rest against the framework 10 in the inoperative over-center position of the bar 17 to limit the movement of the latter toward said position, and the operative position of the bar 17 is determined by an integral foot 27 formed on the hub 20 on the side opposite the lug 26 and adapted to rest upon the framework 10 when said bar is positioned over the drum 12.

For holding the arm 17 securely in operative position over the drum 12, the respective bearing brackets 22 are formed with lateral extensions, such as that shown at 28, Fig. 1, and said extensions are connected by a rod 29. A latch 30 fulcrumed on an outstanding ear 31 formed on the hub-member 20 has one end formed as a handle and its opposite end formed with a hook adapted to take over the rod 29, to hold the hub-member 20 and the bar 17 in fixed position during the operation of applying the bead structures 15 to the tire carcass 13.

A counterweight 32 is mounted on a lever-arm 33 extending radially from the shaft 21 at one end thereof, the arrangement being such that the manual manipulation of the supporting bar 17 is facilitated.

A guide-rod 34 is mounted upon the bar 17, in parallel spaced relation thereto, by means of end-brackets 35, 35, the guide-rod and bar being disposed in the same radial plane with relation to the drum 12. Slidably mounted upon the bar 17 and guide-rod 34 are a pair of sleeves 36, 36 each formed with a tool-mounting arm 37 extending toward the drum 12 and each formed with a laterally-extending lug 38, which lugs are disposed on opposite sides of the bar 17.

A lever 39 is fulcrumed a short distance from one of its ends upon a pivot-pin 40 connecting the bar 17 and guide-rod 34, and a plurality of suitable filler-blocks 41, 41 are mounted upon the pivot-pin 40 at each side of the lever 39 and at each side of the bar 17 and guide-rod 34. The pivot-pin 40 is positioned midway between the brackets 35, substantially at the medial plane of the drum 12. Variable-length links 42, 42 are pivotally connected to the respective lugs 38 of the sleeves 36, and to the lever 39 at points equi-distant from its fulcrum at opposite sides thereof. The arrangement is such that in the inoperative position of the lever 39, shown in full lines in Fig. 1 and broken lines in Fig. 3, the sleeves 36 are positioned farthest apart from each other, and in the operative position of said lever, shown in full lines in Figs. 2 and 4, the sleeves 36 are relatively near each other. An upstanding stud 43 on the lever 39 is so positioned as to abut the guide-rod 34 at the extreme operative and inoperative positions of the lever to limit the range of the lever's movement.

Pivotally mounted on the free end of each tool-mounting arm 37 is a bracket 44 upon one end of which is swiveled a rotatable disc or stitching tool 45 adapted to operate upon a tire bead 15 to roll the same into adhesive engagement with the tire carcass 13, the other end of the bracket 44 being connected by a tension spring 46 to the arm 37. The arrangement is such that the bracket 44 is normally urged around its pivot to cause the stitcher disc 45 to bear yieldingly against the work, yet permitting the disc to change its angularity with relation to the work at different regions thereof. A stop-pin 47 projects laterally from the bracket 44 in position to abut the arm 37 to limit the range of pivotal movement of the bracket 44 under the force of the spring 46.

Slidably mounted upon the bar 17 and guide-rod 34, between the sleeves 36 and on each side of the pivot-pin 40, are a pair of sleeves 48, 48, each formed with a tool-mounting arm 49 extending toward the drum 12 parallel to the arms 37. Each sleeve 48 is connected to the adjacent sleeve 36 by a tension spring 50, and adjustable stop-collars 51, 51 are mounted on the guide-rod 34 to limit the outward movement of the sleeves 48 away from each other.

Adjustably mounted in the free end of each tool-mounting arm 49 is the stem 52 of a tool-bracket 53, and the latter supports the stem 54 of a bearing member 55 in which is journaled a disc tool 56 adapted to engage the flipper 16 of the bead 15. The stem 54 is axially and angularly adjustable in the bracket 53 and extends obliquely toward the drum 12 and stitcher disc 45, the disc 56 being journaled with its flat surface facing the drum and disposed at an acute angle to the surface thereof. The axis of the disc 56 is non-radial with relation to the drum, as shown in Fig. 4, the arrangement being such that the flipper 16 in passing over the marginal portion of the disc 56 is lifted away from the underlying carcass plies of the tire structure 13.

In the operation of the apparatus, the under-bead carcass plies 13 are mounted on the drum 12 in the usual manner and rolled down over the shoulders thereof, the normally-retracted bead-setting rings 14 are moved axially into juxtaposition to the drum where they overlie the marginal portions of the carcass plies 13 thereon, and then the beads 15 are mounted upon the respective rings 14 and positioned against the shoulders of the drum as shown in Fig. 1, the flippers 16 of the beads 15 extending obliquely outward from the drum as shown. The supporting-bar 17 with bead-manipulating tools thereon is then lowered over the drum as the latter is rotated, and latched in place, the respective stitching tools 45, 56 of each pair of stitching tools being thereby positioned at apposite sides of one of the beads 15.

The operator then moves the lever 39 slowly from the position indicated by the broken lines of Fig. 3 to the full-line position of the lever therein. The initial effect of the lever's movement is to move the sleeves 36 carrying the stitching tools 45 toward each other. The tools 45 are thereby impelled laterally over the beads 15, progressively pressing the same into adhesive engagement with the underlying carcass structure as the latter and the beads rotate. The pivotal mounting of the tool-bracket 44 on the arms 37 permits the tools 45 automatically to alter their angularity with relation to the beads, against the tension of the springs 46, so that in the progress of the tools over the beads and onto the flipper portions thereof, the tools are positioned at all times substantially normal to the surfaces against which they are bearing.

As the tools 45 progress onto the flipper portions 16 of the beads 15 they fold said flipper portions onto the respective tools 56 positioned beside them. At this stage of the operation the sleeves 36 engage the sleeves 48 and move them axially along the bar 17, as shown in Fig. 2, with the result that the tools 45, 56 of each pair of tools move in unison while maintaining a determinate spaced relation to each other. Thus as the tools 45 progressively roll down the flippers 16, the unattached portions of the latter are held out of contact with the underlying carcass structure so that premature contact therewith is avoided. The angularity of the tools 56 with relation to the flipper 16 is such that most of the contact between the flippers and tools is at those portions of the latter which, in their rotation, are moving in the direction away from the tools 45, with the result that the flippers are wiped or urged away from said tools and the formation of wrinkles or folds in the flippers is prevented.

Since the tools 45 and 56 are rotatable, there is no chafing of the rubber coating on the flippers such as heretofore has resulted when a non-rotating hand-tool has been used for holding the flippers out of contact with the carcass structure during the progressive rolling down of the flippers.

After the tools 45, 56 complete the attachment of the flippers 16, the operator disengages the latch 30 and swings the bar 17 upward toward its inoperative overhead position, and at the same time throws the lever 39 from the position shown in full lines in Fig. 1 to the position indicated in broken lines therein. This restores the several tool-supporting mechanisms to their original inoperative positions, the sleeves 48 being retracted, by the tension springs 50, to positions in which they abut the collars 51.

The remainder of the operations on the tire-carcass 13 may then be effected without hindrance of the tools overhead, which however are available for immediate use upon subsequent tires.

Our invention is susceptible of modification within the scope of the appended claims.

We claim:

1. Tire-building apparatus comprising a rotatable tire-building form, a pair of tools mounted adjacent thereto and adapted to engage opposite faces of a tire-component thereon, and means for moving said tools in the same direction, laterally of said tire-component, to apply the same to an underlying tire carcass.

2. Tire-building apparatus as defined in claim 1 in which the tools are rotary members.

3. Tire-building apparatus comprising a rotatable tire form, a pair of tools mounted adjacent thereto and adapted to engage a portion of a tire structure thereon, and means for moving one of said tools toward the other a determinate distance and thereafter moving both tools in unison.

4. Tire-building apparatus as defined in claim 3 in which the tool mountings are arranged in spaced relation and one mounting impels the other mounting after traversing the intervening space.

5. Tire-building apparatus comprising a rotatable tire form, a tool-supporting member positionable adjacent thereto, a pair of normally spaced apart tool-mountings slidably carried on said member, a yielding connection between said tool mountings, and means connected with one of said tool mountings for moving it axially on said supporting member, and subsequently so to move the other tool-mounting.

6. Tire-building apparatus as defined in claim 5 including a positive stop for the last mentioned tool-mounting so positioned as to limit the movement thereof toward the other tool-mounting under the impetus of the yielding connection between them.

7. Tire-building apparatus comprising a rotatable tire form, and a pair of rotatable tools mounted adjacent thereto and adapted to engage an unattached portion of a tire structure thereon, one of said tools exerting a rolling pressure on said portion and the other tool effecting a constant wiping toward the margin thereof.

8. Tire-building apparatus as defined in claim 7 including means for moving both tools transversely of said unattached portion.

9. Tire-building apparatus comprising a rotatable form adapted to support thereon a partly-built tire structure, a pair of rotatable tools mounted adjacent thereto and adapted to engage and attach a tire component to said structure, one of said tools exerting a rolling pressure on said component and the other of said tools supporting an unattached portion of said component out of contact with said structure.

10. Apparatus for attaching a tire component to a partly-built tire structure comprising a form for supporting the structure, means for applying pressure to the component by progression toward its unattached portion and means comprising a member movable relative to the form for supporting said portion out of contact with the structure and for progressively releasing the same.

11. Tire-building apparatus as defined in claim 10 in which said supporting means is adapted to wipe the unattached portion of said component progressively in a direction away from the attached portion thereof.

12. Apparatus for attaching a flipper bead to a partially-built tire structure comprising a form for supporting said structure, means for mounting said bead upon the structure with the flipper portion of the bead unattached, means for applying rolling pressure to the bead progressively from its attached portion toward the unattached edge of the flipper, and means for supporting the flipper out of contact with said structure and progressively releasing the same as pressure is applied, said supporting means being effective to wipe the flipper toward its unattached edge.

13. Apparatus as in claim 12 in which said supporting and releasing member is freely rotatable on an axis oblique to the supported flipper.

14. Apparatus for attaching a tire component to a partly-built tire structure component comprising a form for supporting the structure, means for applying pressure to the component by progression toward its unattached portion, and means comprising a rotatable member for supporting said portion out of contact with the structure and for progressively releasing the same, said member being adapted to wipe the unattached portion of said component away from the attached portion thereof.

15. Apparatus for attaching together components of a rubberized structure by progression toward unattached portions thereof comprising a support for said structure, means comprising a rotatable member for supporting an unattached portion of one of the components out of contact with the other component and for progressively releasing the same, said rotatable member and said support being capable of such relative movement as to cause said member during release of the supported component to exert on the unattached portion thereof a wiping action away from its attached portion.

16. Apparatus as defined in claim 15 in which the supporting and releasing member is freely rotatable on an axis oblique to the supported component.

In witness whereof we have hereunto set our hands this 8th day of November, 1928.

CHARLES W. LEGUILLON.
NOAH L. WARNER.